March 29, 1966 E. LEE ETAL 3,243,576
BROILER ATTACHMENT FOR FRYING PANS
Original Filed Nov. 24, 1961 4 Sheets-Sheet 1
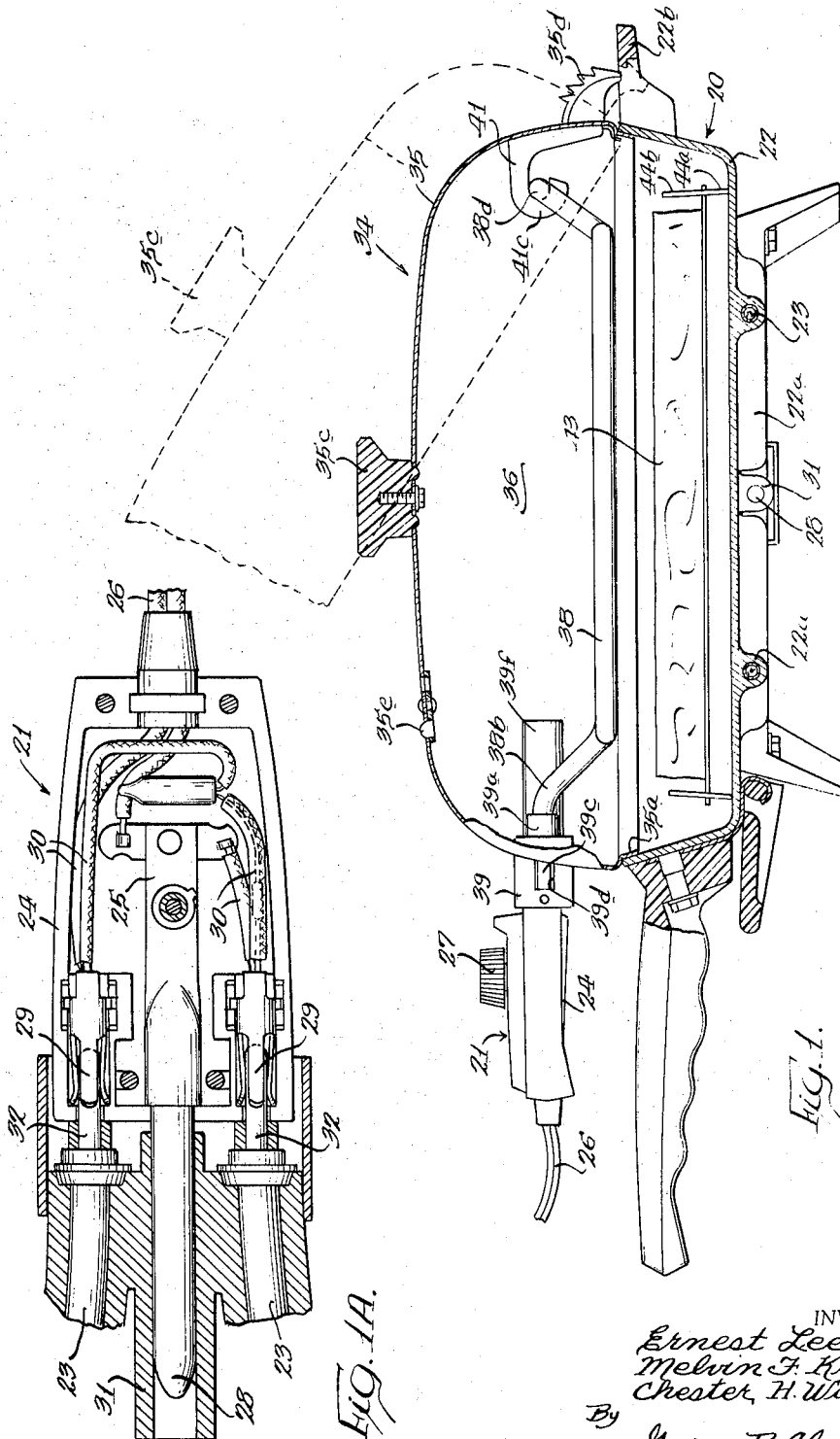
INVENTORS:
Ernest Lee
Melvin F. Krauss
Chester H. Wickenberg
By George R. Clark Atty

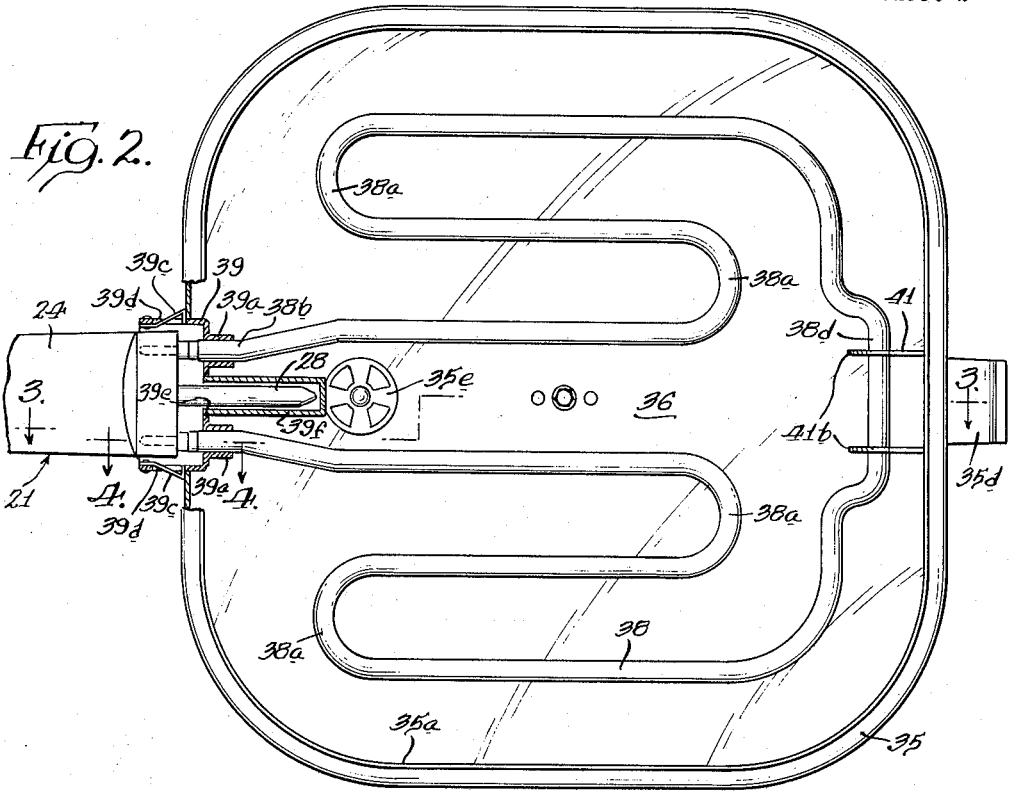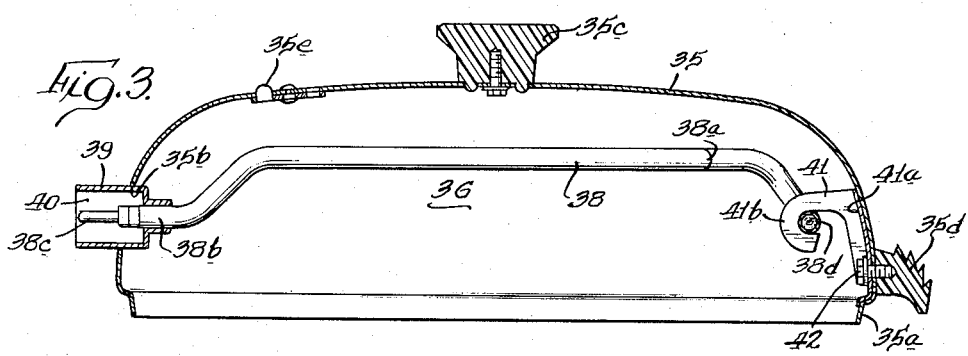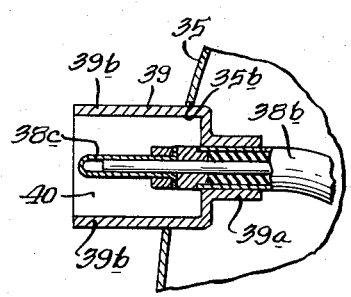

March 29, 1966     E. LEE ETAL     3,243,576
BROILER ATTACHMENT FOR FRYING PANS
Original Filed Nov. 24, 1961     4 Sheets-Sheet 3
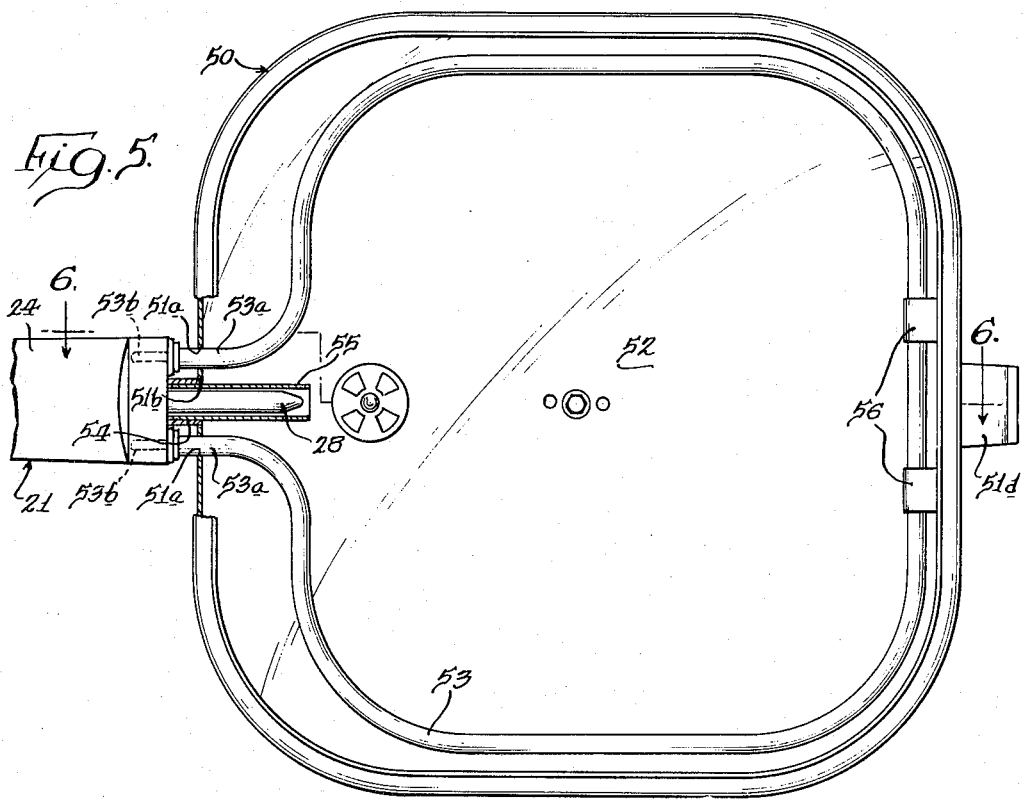
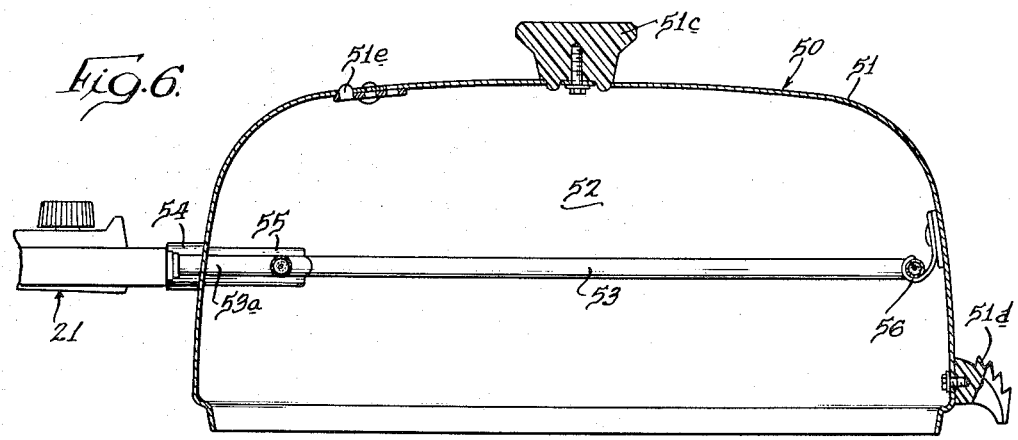
INVENTORS:
Ernest Lee
Melvin F. Krauss
Chester H. Wickenberg
By George R. Clark   Atty March 29, 1966  E. LEE ETAL  3,243,576
BROILER ATTACHMENT FOR FRYING PANS
Original Filed Nov. 24, 1961  4 Sheets-Sheet 4
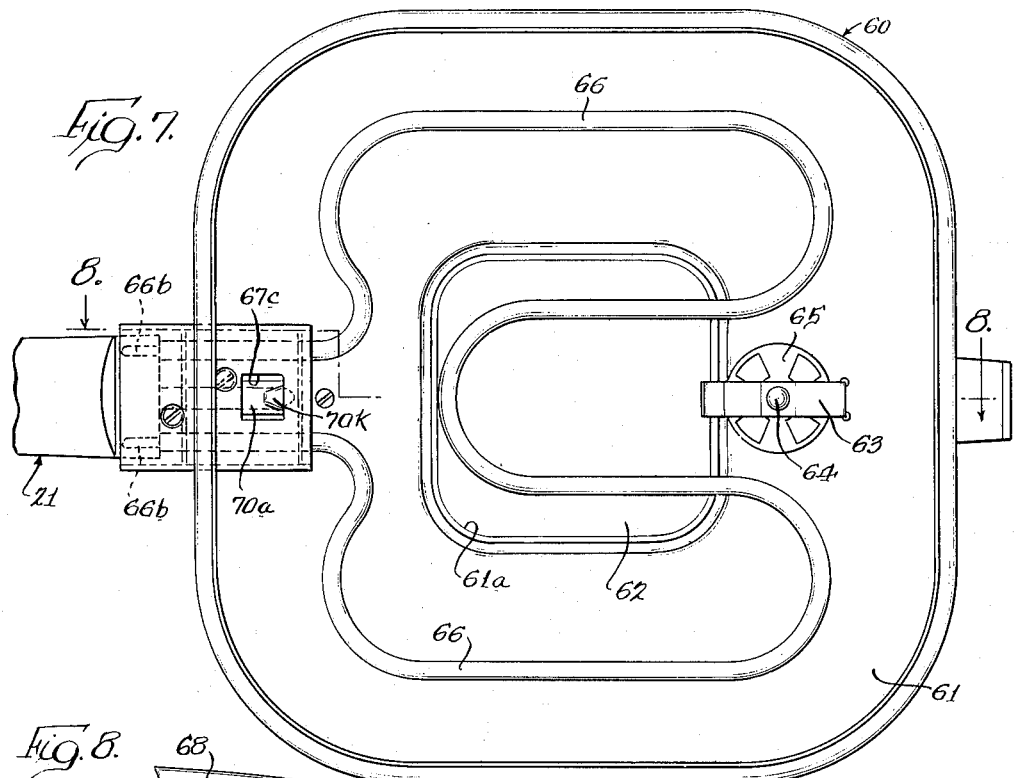
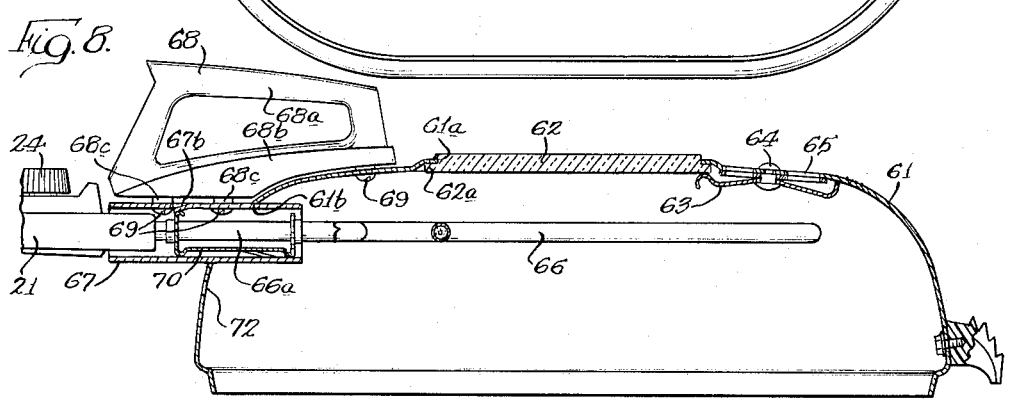
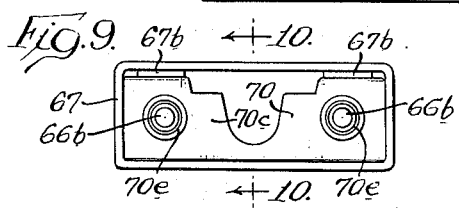
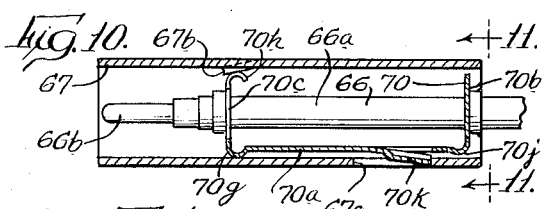
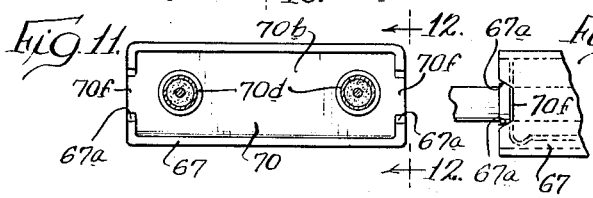
INVENTORS:
Ernest Lee
Melvin F. Krauss
Chester H. Wickenberg
By George R. Clark, Atty

United States Patent Office 3,243,576
Patented Mar. 29, 1966

3,243,576
BROILER ATTACHMENT FOR FRYING PANS
Ernest Lee, Park Ridge, Ill., Chester H. Wickenberg, Huskvarna, Sweden, and Melvin F. Krauss, Elmhurst, Ill., assignors to Sunbeam Corporation, Chicago, Ill., a corporation of Illinois
Original application Nov. 24, 1961, Ser. No. 154,474. Divided and this application May 20, 1965, Ser. No. 457,409
3 Claims. (Cl. 219—386)

This is a division of application Serial No. 154,474, filed November 24, 1961.

This invention relates to electric broilers and more specifically to broiling attachments for frying pans.

In recent years there have been developed many home cooking appliances which utilize electric heating elements integrally associated with the appliance structure. The most important of these appliances, based on its high volume of sales and enthusiastic acceptance by the housewife, is the electric frying pan or frypan, as it is sometimes called. The frypan has taken the form of a shallow vessel of round or square shape to which an electric heating element has been intimately associated by brazing to a stamped aluminum vessel or casting it integrally with a die cast vessel. Thermostatic means have been provided to regulate the temperature of the cooking surface of the frypan by switching the heating element on and off.

To permit the frypan to be immersed completely in water for washing purposes, the thermostat including the sensing element and switch have, in one design, been detachably associated with the frypan. This design with the removable or detachable thermostat has been given the appellation of the "probe type" frypan. The term "probe" was undoubtedly chosen because of the manner in which the thermostat is conventionally associated with the frypan with a tube-like sensing element insertable into a recess in the frypan.

Prior to the last decade, broiling of food was performed almost exclusively in the oven of a stove. Broiling in the oven of a stove is unsatisfactory in most instances since the enclosure is much larger than necessary and the housewife seldom has a large enough piece of meat to utilize efficiently all the heating element area available. As a result, there is much wasted heat which serves no purpose other than to heat up the kitchen. In addition, the housewife is presented with the problem of cleaning or scouring a large oven even after broiling a small quantity of food. The housewife's dissatisfaction with the oven for broiling has led to the development of a variety of separate electric broilers which overcome some of the disadvantages mentioned above.

These recently developed broilers have failed to completely satisfy the needs of the housewife and have, therefore, not experienced widespread acceptance. In general, the present day electric broiler performs too limited a function and is extremely difficult to keep in a sanitary condition. Because of the smoke and grease associated with a broiling operation, a satisfactory broiler should be immersible in water for cleaning purposes. Most broilers currently available cannot be immersed for washing and must be merely wiped out with a damp rag or sponge to remove deposits of grease.

With respect to the limited function performed by these broilers, it should be appreciated that no thermostatic control means are normally included. The electrical element is connected to a power source and remains on until the end of the cooking cycle, at which time it is disconnected manually or in the case of the more expensive units, by means of a timer. There are many occasions when the housewife may wish to use the broiler in such a way that the food is broiled or browned on the surface to some extent and also cooked through. For example, chickens, turkeys and small roasts must be cooked more slowly than is possible in the conventional broiler which would leave the interior portions almost raw while the surface might be burned. It is, however, desirable to obtain a surface browning on these foods as may be achieved by a limited exposure to a broiling element. Without any thermostatic control, it is impossible to cycle the heating element as it must be to perform this type of combination cooking.

It would be desirable to combine the thermostatic control of the electric frypan with a broiler to increase the versatility of the broiler. In addition, it would be desirable to have a broiler which could be readily immersed in water for washing purposes without damaging the parts thereof.

Accordingly, it is an object of the present invention to provide an improved electric broiler which is completely immersible in water for cleaning purposes.

It is a further object of the present invention to provide an electric broiler having a detachable thermostatic control to permit immersion of the broiler for washing purposes.

It is an additional object of this invention to provide an electric broiler attachment for use with a frying pan.

It is an additional object of the present invention to provide a broiler cover for an electric frypan, said cover being designed to receive a detachable heating element and thermostatic control means.

It is a further object of the invention to provide a combined electric frypan and broiler cover wherein the detachable probe control for the frypan may be operatively associated with the broiler cover.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a side elevational view partially in section of a frying pan and broiler embodying our invention;

FIG. 1a is a greatly enlarged fragmentary sectional view of a temperature responsive control means associated with a cooking vessel;

FIG. 2 is a bottom plan view of the broiler of FIG. 1 with the heating element mounted in an alternative position and with portions thereof shown in section;

FIG. 3 is a sectional view taken on line 3—3 of FIG. 2;

FIG. 4 is an enlarged fragmentary sectional view taken on line 4—4 of FIG. 2, assuming that FIG. 2 shows the complete structure with the control unit removed;

FIG. 5 is a bottom plan view of a second embodiment of a broiler with portions thereof shown in section;

FIG. 6 is a sectional view taken on line 6—6 of FIG 5, assuming FIG. 5 shows the complete structure;

FIG. 7 is a bottom plan view of a third embodiment of a broiler embodying our invention;

FIG. 8 is a sectional view taken on line 8—8 of FIG. 7;

FIG. 9 is an enlarged view of the plug receptacle of the broiler shown in FIGS. 7 and 8;

FIG. 10 is a sectional view taken on line 10—10 of FIG. 9;

FIG. 11 is a rear elevational view of the plug receptacle taken on line 11—11 of FIG. 10, assuming FIG. 10 shows the complete receptacle; and FIG. 12 is an enlarged fragmentary view taken on line 12—12 of FIG. 11.

Referring now to the drawings, there is illustrated a cooking vessel or frying pan generally designated at 20 comprising a removable, temperature responsive control means 21 which may be physically removed from the vessel during cleaning operation of the vessel, but which when associated with the vessel provides accurate temperature control at any selected setting thereof. Considering first the cooking vessel, it comprises a vessel portion 22 which may be formed of any suitable metal. In a device built in accordance with the present invention, it comprised an aluminum die casting. The vessel portion 22 is of rectangular shape with rounded corners having a shallow depth so as to define what is commonly referred to as a frying pan.

For the purpose of heating the vessel 22, there is associated with the bottom of the vessel an electric heating element generally designated by reference numeral 23. The heating element 23 is of the sheathed type and is shown as integrally cast in a rib 22a positioned on the bottom of the vessel portion 22. The power connection for the heating element 23 and the manner in which the temperature responsive control means 21 cooperates with the vessel 22 is completely described in United States Patent No. 3,068,342 issued December 11, 1962, and assigned to the same assignee as the instant application.

As is explained in the above cited United States Patent No. 3,068,342 as shown schematically in FIG. 1a, the control unit 21 includes a housing 24 within which is mounted a thermostatic switch 25. A power cord 26 is connected to the housing 24 to supply power to the heating element 23. The thermostatic switch 25 of the control unit 21 includes a control knob 27 positioned outside of the housing 24 to provide means for adjusting the temperature to which the control unit will regulate the vessel portion 22. Mechanically connected to the switch 25 is a temperature sensing probe 28 which actuates the switch in response to temperature variations. In the conventional construction, a pair of terminal members 29 are positioned within the housing 24 on either side of the probe 28. Suitable openings are provided in the housing 24 to permit the insertion therein of terminal pins on the vessel 22 for contact with the terminals 29. The terminals 29, the switch 25 and the power cord 26 are interconnected by suitable conductors 30 as is explained in detal in the above-identified United States patent.

As shown in FIGS. 1 and 1a, the vessel portion 22 includes integrally formed walls 31 providing a recess within which the probe 28 may be received to sense the temperature of the vessel. The heating element 23 is formed with suitable terminal pins 32 which may be engaged by the terminals 29 of the control unit 21 as is shown in FIG. 1a.

To adapt the frying pan 20 to broil food as well as fry it, there is provided a broiler or broiler attachment 34 which, when used with the cooking vessel 20, provides a multi-purpose appliance for baking, broiling, roasting and stewing. The attachment includes a deep cover 35 which is of generally cup-shaped configuration with a square shape and rounded corners to conform to the contour of the vessel portion 22. The cover 35 cooperates with the vessel portion 22 to form a cooking chamber 36. The cover 35 has an inwardly formed lip 35a which engages the upper edge of the walls of the vessel portion 22 and prevents the cover 35 from being displaced from its position in engagement with the vessel portion. The lip 35a also lessens the possibility of leakage of moisture and vapor from the interior of the frying pan.

While the cooking chamber 36 is conventionally used for baking or roasting foods, the cover 35 has been provided with means to permit the broiling of foods within the cooking chamber 36. To accomplish the broiling function, a sheathed heating element 38 is mounted in the cover 35. As may best be seen in FIG. 2, the broiling heating element 38 is formed with a plurality of 180 degree bends 38a thereby providing a tortuous configuration which will radiate heat over the entire interior surface of the vessel portion 22. As may best be seen in FIG. 1, a substantial portion of the heating element 38 is disposed in a single horizontal plane. The portions of the heating element, by means of which it is mounted, extend out of this horizontal plane. Extending toward the middle of one of the side walls of cover 35 are end portions 38b of the heating element 38. The end portions 38b of the heating element are supported and interconnected by means of a terminal shield or plug receptacle 39.

The terminal shield 39, as is best shown in FIGS. 2 and 3, has a pair of inwardly extending bosses or sleeves 39a having openings therein which receive and support the ends 38b of the heating element. The sleeves 39a may be deformed or staked in gripping engagement with the ends 38b of the heater. The ends 38b of the heating element extending through the sleeves 39a are provided with terminal pins 38c which are suitably insulated from the sheath portion of the heating element and electrically connected to the resistance wire extending through the sheath in the conventional manner. To protect the terminal pins 38c and reduce the shock hazard associated with the power connection, the terminal shield 39 is formed with outwardly extending walls 39b which form a recess 40 within which the terminal pins 38c are positioned.

While one side of the heating element 38 is supported by the terminal shield 39, to increase the rigidity of the heating element and assure accurate positioning thereof, there is provided at the side of the cover opposite from the terminal shield 39 a support bracket 41. The support bracket 41 is essentially U-shaped having a base 41a thereof assembled to the cover by means of a bolt 42. Extending outwardly from the base 41a of the bracket 41 are a pair of hook-shaped arms 41b. The internal radius of the hooks 41b is the same as the sheath of the heating element 38. A vertically displaced horizontally extending portion 38d of the heating element 38 is received on the hooks 41b. It should be noted that the vertically displaced portion 38d of the heating element is located in the same plane as the ends 38b of the heating element.

In order that the cover 35 may be easily washed, it is preferable that the heating element 38 be removably mounted therein. To accomplish this removable mounting of the heating element 38, the terminal shield 39 is provided with a pair of flexible latch members 39c. As may best be seen in FIG. 2, each of the latch members 39c have one of their ends secured within the recess 40 with the remainder of the latch member extending outwardly through an opening 39d in the walls 39b. The terminal shield 39 extends outwardly through an opening 35b in the wall of the cover 35. The opening 35b is of such a shape as to snugly receive the walls 39b of the terminal shield.

To assemble the heating element 38 to the cover 35, the terminal shield 39 is inserted through the opening 35b from the inside while hooking the portion 38d of the heating element over the hooks 41b. The terminal shield 39 is moved through the opening 35b until the latch members 39c deflect outwardly through the openings 39d and engage the outer surface of the wall of the cover 35. It will be appreciated that the latch members 39c are cammed inwardly through engagement wtih the sides of the opening 35b as the terminal shield is inserted therethrough. The heating element may be readily removed by applying finger pressure to the latch members 39c until they are deflected inwardly to such an extent that the terminal shield 39 may be drawn inwardly through the opening 35b. It should be appreciated that the latch members 39c cooperate with the hooks 41b to assemble the heating element 38 firmly within the cover 35. At the same time, these supporting means permit the heating element to be readily removed so that the cover 35 may be washed.

The broiler 34 with its heating element 38 and terminal shield 39 is adapted to be controlled by the same control unit 21 which is for use with the cooking vessel 20. Thus the control unit 21 may supply power to and regulate either the heating element 23 in the cooking vessel 20 or the heating element 38 of the broiler 34.

In order to provide clearance for the probe 28 when the control unit 21 is assembled to the broiler 34, the terminal shield 39 is formed with a central opening 39e which is positioned between the sleeves 39a. Received in the opening 39e is an elongated tubular shield 39f which extends inwardly toward the center of the cover 35. The end of the tubular shield 39f is closed to form a recess within the probe 38 is received. The purpose of the shield 39f is to prevent heat from being radiated directly from the heating element 38 to the probe 28.

In broiling most foods such as steaks, chops and the like, it is desirbale to have the heating element 38 energized for substantial periods of time. Because of the relatively high temperature of a sheathed heating element of this type, about 1600 degrees Fahrenheit, and the fact that the control unit 21 for the frying pan is normally designed to control at a high temperature of 420 degrees Fahrenheit, it is necessary to shield the probe 28 from the heating element 38 if the element 38 is to remain energized for more than a short period of time. Thus by providing a shielding means 39f for the probe 28 and having suitable means for dissipating the heat delivered to the shielding means, it is possible to operate the heating element 38 for substantial periods before it is shut off by the control unit 21 even though the control unit is set to shut off the power to the heating element at a much lower temperature than the one at which the heating element operates. When it is desired to cycle the element 38 to obtain a combination of broiling and baking, the control unit 21 may merely be set for a lower temperature. It should be appreciated that in its application to or use with the broiler 34, the control unit 21 is adjusted to various temperature settings which, because of the shielding, will have only a proportional relationship to the actual temperatures in the cooking chamber 36. In using the broiler 34, the rate of cycling of the element 38 is of primary interest.

Inasmuch as the broiling operation is normally controlled by regulating the distance between the broiling element and the food, it is advantageous to have either an arrangement for varying the position of the heating element or the position of the food to modify the relative distances between the food and the heating element. In describing the configuration of the heating element 38, it was pointed out that the ends 38b and the other mounting portion 38d are displaced vertically relative to the horizontal plane within which most of the heating element is disposed. This vertical displacement between the mounting portions and the remainder of the heating element permits the element to be mounted at two different heights as may be best appreciated by comparing FIGS. 1 and 3 which illustrate the alternative mountings. In FIG. 1 the mounting portions of the element are displaced upwardly from the remainder of the element. In FIG. 3 the mounting portions of the element are displaced downwardly from the remainder of the element. A brief review of the above-described method of mounting the element will make it readily apparent that the latch members 39c are effective in rigidly mounting the heating element in either one of the two alternative positions.

To facilitate handling of the broiler 34, a centrally disposed insulated handle 35c is provided on the cover 35. In addition, the cover 35 has a second handle 35d which cooperates with a handle 22b on the vessel 22 to permit the cover 35 to be mounted in an angular position with respect to the vessel 22. The dotted showing of the cover in FIG. 1 clearly illustrates this position. A more detailed disclosure of the handles 35d and 22b appears in United States Patent No. 3,068,342 and assigned to the same assignee as the instant application. To permit the escape of smoke, moisture and the like from the cooking enclosure 36, the cover 35 is formed with a rotatable vent 35e which comprises a rotatable member having a plurality of openings which may be rotated into and out of alignment with corresponding openings in the cover depending on whether the vent is to be opened or closed.

When the control unit 21 is assembled to the broiler 34, the forward end of the housing 24 is received in the recess 40 with the probe 28 entering the tubular shield 39f and the terminal pins 38c of the heater entering the housing 24 and engaging the terminals 29. With the control unit so connected, the power cord 26 is adapted to energize the heating element 38. Depending on the setting of the control knob 27, the heating element may be either continuously or intermittently energized. As was explained above, the heating element 38 may be mounted either in the upper position as shown in FIG. 3 or the lower position as shown in FIG. 1. The food to be broiled is placed in the vessel portion 22. It is usually desirable to support the food to be broiled in such a manner that grease produced by the cooking operation will run off and not be held in contact with the food. To accomplish this purpose, the food designated in FIG. 1 by reference numeral 43 is supported on a wire trivet or rack 44. The rack 44 is formed with lower supporting legs 44a and upper supporting legs 44b. As is evident from FIG. 1, the lower legs 44a are somewhat shorter than the upper legs 44b. This type of trivet 44 provides a means for varying the height of the food 43 and, therefore, the distance between the heating element and the food 43. Thus, the food may be raised in height from the position shown in FIG. 1. merely by inverting the trivet 44 whereby it is supported by the longer legs 44b. It is evident, therefore, that with the variation in heating element height provided by the mounting arrangement for element 38 and with the variable height trivet 44, considerable variation is possible in the relative heating element to food distance.

Turning now to the embodiment shown in FIGS. 5 and 6, it should be noted that it is similar in many functional and structural respects to the first described embodiment. It is intended to cooperate with a frying pan or vessel 20 in the same way as the first emodiment. For simplification purposes, the vessel 22 has not been shown in FIGS. 5 and 6. In addition, the control unit 21 is identical to the control unit described in connection with the other embodiment. In FIGS. 5 and 6 there is illustrated a broiler or broiler attachment generally designately by reference numeral 50 and including a deep, cup-shaped cover member 51 which is adapted to cooperate with a frying pan or cooking vessel such as 22 shown in FIG. 1. The cover 51 as may be noted from FIG. 6 is somewhat deeper having higher side walls than the cover 35 shown in FIG. 1. The deep cover configuration may be particularly advantageous in connection with combination type cooking in which foods are baked or roasted as well as being broiled in a cooking chamber 52 formed by the cover 51 and a suitable frying pan or other vessel. The cooking chamber 52 formed by the deeper cover permits the cooking of chickens, turkeys and small roasts when desired. It should be appreciated that such foods may not be cooked entirely by means of a broiler since the surfaces of the food would be burned before it was cooked satisfactorily on the inner portions. It is contemplated, therefore, that in cooking such foods, the control unit 21 would be set for a lower temperature than the maximum prescribed for continuous broiling.

Mounted within the cover 51 is a heating element 53 which is in the form of a generally square loop having rounded corners and having ends 53a which extend from the midpoint of one side of the square in spaced parallel relation. The side walls of the cover 51 are provided with a pair of openings 51a through which the ends 53a of the heating element extend. At the outer ends of the sheathed heating element 53, there are terminal pins 53b which are insulated from the sheth of the heating element 53 and electrically connected to the helical resistance wire of the heating element. In FIG. 5, the control unit 21 is shown assembled to the broiler 50 with the terminal pins 53b of the heating element 53 extending into the housing 24 for engagement with the terminals mounted therein.

In between the holes 51a on the cover 51, there is a third larger hole 51b through which the temperature responsive probe 28 extends. To receive and guide the probe 28, there are provided two concentric sleeves 54 and 55. The outermost sleeve 54 is brazed or otherwise secured to the cover 51 in alignment with the opening 51b extending outwardly from the side wall. The inner sleeve or shield 55 is received within the sleeve 54 and fixedly secured thereto by brazing or other suitable means. The shield 55 extends inwardly into the cooking chamber 52 a distance sufficient to shield the entire length of the temperature responsive probe 28. As shown in FIG. 5, it may be noted that the shield 55 is open at the end rather than being closed as was the shield 39f in the embodiment of FIGS. 1 through 4. It has been found that in some instances better thermal response is achieved if the probe 28 is positioned in an area where there may be some circulation of air. Thus, with the loose fit between the probe 28 and the tubular shield 55, there is a tendency for air to circulate therethrough and prevent undesirable temperature rises in the probe 28. While no shield has been shown for the terminal pins 53b, it should be understood that such a shield may be provided if desired. It would take the form of a tube of rectangular cross section similar to the one shown in the first embodiment but would be rigidly secured to the side wall of the cover 51.

To complete the support of the heating element 53 with respect to the cover 51, there are a pair of small hook-shaped brackets 56 which engage the heating element 53 along the portion opposite the ends 53a. The hook-shaped brackets 56 are spaced several inches apart and extend around the heating element 53 to such an extent that it is gripped thereby. The brackets are secured to the wall of the cover 51 by riveting or brazing. With the ends 53a of the heating element received within the openings 51a in the wall of the cover and the opposite portions gripped by the hook-shaped brackets 56, the heating element 53 is rigidly supported in the cover 51. The cover 51 is also provided with a cover knob 51c, a supplementary handle 51d and an adjustable vent opening 51e all of which parts are substantially identical to the corresponding parts described in the embodiment of FIGS. 1 through 4.

The broiler 50 is a less complex design and somewhat more limited in utility than the broiler 34 of the first embodiment. There is no height adjustment or means for removal of the heating element. Thus, when the broiler 50 is washed, the control unit 21 is removed and the cover 51 with the heating element 53 assembled thereto may be immersed for washing purposes. If it is desired to completely immerse the heating element, it would be necessary to provide a moisture seal between the terminal pins 53b and the outer sheath of the heating element 53. With the heating element 53 being less tortuous in configuration than the heating element 38 of the first embodiment, the scouring of the interior of the cover 51 would not be too difficult even though the heating element is not removable. As was pointed out above, by having the heating element 53 extending around the periphery of the cover 51 and by utilizing a cover which is deep with high side walls, it is possible to cook chickens and turkeys and large food items which normally would not be accommodated in the cooking chamber formed by a frying pan and its cover.

Referring to FIGS. 7 through 12, there is shown a third embodiment of the invention which is designated generally by the reference numeral 60. The broiler 60 again utilizes the same control unit 21 which was described in detail in connection with the embodiment of FIGS. 1 through 4. The broiler 60 includes a cover 61 having a centrally located opening 61a within which is positioned a window 62 made of a heat resistant glass. The purpose of the window is to permit observation of the food being cooked. The window 62 is molded with a groove 62a extending along one edge thereof for engagement with the cover 61 along one edge of the opening 61a. Opposite the grooved edge of the window 62, there is a removable clip or window retainer 63 which is pivotally secured to the cover 61 by means of a rivet 64. The rivet 64 also serves to assemble a rotatable vent 65 to the cover 61.

The broiler 60 includes a sheathed heating element 66 which is tortuous in shape with its entire length in substantially one plane. The heating element has a pair of spaced parallel end portions 66a which extend outside of the cover 61 and carry at their outer ends terminal pins 66b which are insulated from the sheath portion of the heating element.

To accommodate the connection between the control unit 21 and the heating element 66, there is provided a terminal shield 67. The terminal shield 67 is an elongated tubular member of rectangular cross section which is received in an opening 61b in the cover 61. The opening 61b is located in a curved portion of the cover 61 as may be best seen in FIG. 8. The horizontal dimension of the opening 61b is of sufficient extent to accommodate the terminal shield 67. The distance between the upper and lower edges of the opening 61b, however, is made somewhat less than is necessary to accommodate the terminal shield 67 when positioned horizontally as shown in FIG. 8. Thus, the terminal shield is inserted into the opening 61b at an angle and forced to a horizontal position in which it interferes with the upper and lower edges of the opening 61b giving an interference type assembly which assures its rigidity with respect to the cover 61. To facilitate the handling of the cover 61 and to retain the terminal shield 67 assembled thereto, a loop-shaped handle member 68 is provided. The handle 68 has two horizontally extending spaced portions 68a and 68b. The uppermost portion 68a forms the handle grip while the lower portion 68b is an assembly portion which is threadedly engaged by three screws 69, two of which extend through openings in the terminal shield 67, and one of which extends through an opening in the cover 61. Spacers 68c are positioned between the handle 68 and both the terminal shield 67 and the cover 61 to lessen heat transfer to the handle. In the light of the above description, it is obvious that the handle 68 with its assembly screws 69 rigidly secures the terminal shield 67 to the cover 61.

The heating element 66 is completely supported by means engaging the terminal shield 67. This supporting means takes the form of a U-shaped support member 70 which is received on the end portions 66a of the heating element 66. The U-shaped support member includes a base 70a, an inner supporting portion 70b and an outer supporting portion 70c as may best be seen in FIG. 10. The inner supporting portion 70b has a pair of pierced holes 70d formed to receive the ends 66a of the heating element. Similarly, the outer supporting portion 70c is formed with a pair of openings 70e which are in alignment with the openings 70d and also receive the ends 66a of the heating element 66. In the forming of the openings 70d and 70e, material from the supporting portions 70b and 70c are formed into sleeves defining the openings.

These sleeves are deformed or staked to grip the ends 66a of the heating element. Both of the supporting portions 70b and 70c are of sufficient width to snugly engage the interior of the terminal shield 67 thereby accurately assembling the heating element 66 to the cover 61. As best shown in FIG. 11, the inner supporting portion 70b has sidewardly extending protuberances 70f which are received in V-shaped notches 67a in the inner ends of the side walls of terminal shield 67.

The outer supporting portion 70c is formed with radiused corners 70g at the lower edge thereof and 70h at the upper edge thereof. The radiused corners 70g and 70h facilitate the insertion and withdrawal of the support member 70 from the terminal shield 67. To insure rigid engagement of the outer supporting portion 70c with the terminal shield 67 and prevent vertical displacement therein, a pair of tabs 67b are formed downwardly from the top wall of the terminal shield 67, as may be seen in FIGS. 8, 9 and 10. The inner supporting portion 70b is provided with a radiused bend 70j to provide a low frictional engagement with the terminal shield 67. It should be noted that there are clearances between the upper end and lower radiused bend 70j of the inner supporting portion 70b and the terminal shield 67. The reason for these clearances is that the protuberances 70f and the notches 61a locate the inner end of the support member 70 and lock it against vertical displacement. The protuberances 70f also serve the purpose of acting as stop members for the heater as it is assembled into the terminal shield 67.

To retain the support member 70 and the heating element 66 assembled to the cover 61, a flexible latch member 70k is formed downwardly from the base 70a of the support member 70. The latch member 70k is inclined so that the support member 70 may be inserted into the terminal shield 67 with the wall of the terminal shield 67 deflecting the latch member 70k upwardly as it enters the opening. An opening 67c provided in the bottom wall of the terminal shield 67 is positioned to receive the latch member 70k after the assembly of the heating element 66 and the support member 70 have been moved into seated engagement with the terminal shield 67. The resiliency of the latch member 70k moves it downwardly so that it will engage the innermost edge of the opening 67c. To remove the heating element from its assembled position in the cover 61, it is merely necessary to deflect the latch member 70k upwardly until it disengages from the edge of the opening 67c. The support member 70 may then be moved out of engagement with the terminal shield 67.

To improve the action of the broiler 60, it has been found desirable to increase the circulation of air within the cover 61. This is accomplished by placing a horizontally disposed slot 72 about one and one-half inches long immediately beneath the terminal shield 67. The slot 72 cooperates with the vent 65 to cause a circulation of air within the cover 61. This circulation of air also aids in cooling the shield 67 which, in turn, prevents the probe 28 from being heated to a temperature at which the control unit 21 de-energizes the heating element 66.

In the various disclosed embodiments of the invention, the means on the broiler to shield the temperature responsive probe from the direct radiation from the heating element takes various forms. In the embodiment of FIGS. 1-4, the shielding means includes the fixed, closed end tube 39f. In the embodiment of FIGS. 5 and 6, the shielding means comprises that tube 55 which may be adjustably positioned and has an open outer end. In the embodiment of FIGS. 7-12, the terminal shield 67 performs the shielding function. While the temperature responsive probe in the last mentioned embodiment would be exposed to radiation from the parallel supporting end portions 66a of the heating element, the shield 67 protects the probe from most of the energy radiated by the element 66 thereby preventing premature deenergization of the element 66 by the control 21.

The heating element supporting means described above in connection with the embodiment of FIGS. 7 through 12 has the advantages of providing an easily detachable rigid connection between the heating element 66 and the cover 61. When heating element 66 and control unit 21 are removed, the cover 61 may be quickly and easily washed since there will be no brackets or supports left within the cover 61 to interfere with the washing process.

While there have been illustrated and described several embodiments of the present invention, various changes and modifications will occur to those skilled in the art, and it is intended in the appended claims to cover all such changes and modifications as fall within the true spirit and scope of the present invention.

What is claimed as new and desired to be secured by Letters Patent of the United States is:

1. A broiler for a frying pan comprising an inverted cup-shaped cover adapted for assembly to a frying pan to form a cooking chamber, a tortuous sheathed heating element having terminal pins extending from the ends thereof in spaced parallel relation, a terminal shield connected to said heating element adjacent said ends, latch means removably supporting said shield in an opening in the wall of said cover, said heating element being formed with said terminal pins and shield displaced from a plane in which the remainder of said element is positioned, and said shield being receivable in said opening in two alternative positions to locate said remainder of said element in either of two vertically spaced positions.

2. A broiler for a frying pan comprising an inverted cup-shaped cover adapted for assembly to a frying pan to form a cooking chamber, a tortuous sheathed heating element lying substantially in one plane with the ends thereof and an intermediate portion displaced from said plane, said element having terminal pins extending from said ends in spaced parallel relation, support means interconnecting the ends of said heating element, means removably connecting said support means to said cover with the ends of said element extending through an opening in the wall of said cover, a bracket on said cover on a wall opposite from said opening, said bracket receiving and supporting said intermediate portion of said heating element, said heating element being removably mounted in said cover in two alternative positions vertically displaced from each other.

3. A broiler for a frying pan comprising an inverted cup-shaped cover, a tortuous sheathed heating element lying substantially in one plane with the ends thereof displaced from said plane, said element having terminal pins extending from said ends in spaced parallel relation, support means interconnecting the ends of said heating element, an opening formed in the wall of said cover, latch means detachably mounting said support means on said cover within said opening, a power cord including a detachable control means having power terminals for engagement with said terminal pins and a temperature responsive portion received within said cover, and means on said support means for shielding said temperature responsive portion from said heating element, said heating element being removably mounted in said cover in two alternative positions vertically displaced from each other.

References Cited by the Examiner

UNITED STATES PATENTS

| | | | |
|---|---|---|---|
| 1,831,820 | 11/1931 | Noble | 219—409 X |
| 1,974,360 | 9/1934 | Kimmel | 219—441 |
| 2,538,567 | 1/1951 | Jones | 219—454 |
| 2,926,230 | 2/1960 | Foster | 219—435 |

RICHARD M. WOOD, *Primary Examiner.*

R. F. STAUBLY, *Assistant Examiner.*